United States Patent [19]

Bien

[11] Patent Number: 4,792,475
[45] Date of Patent: Dec. 20, 1988

[54] COMPOSITE JOINT PAD FOR SYNTHETIC RESIN PANEL

[75] Inventor: Alfred A. Bien, W. Bloomfield, Mich.

[73] Assignee: Chrysler Motors Corporation, Highland Park, Mich.

[21] Appl. No.: 109,015

[22] Filed: Oct. 16, 1987

[51] Int. Cl.⁴ ............................................. F16B 5/02
[52] U.S. Cl. ................................. 428/137; 428/65; 403/408.1; 411/427
[58] Field of Search ............... 428/137, 65; 411/427, 411/908; 403/408.1

[56] References Cited

U.S. PATENT DOCUMENTS 4,348,140 9/1982 Bergholz et al. ............ 403/408.1 X
4,448,565 5/1984 Peterson .......................... 411/427

Primary Examiner—Alexander S. Thomas
Attorney, Agent, or Firm—Edward P. Barthel

[57] ABSTRACT

A mounting arrangement and method of manufacture for clamping synthetic resin panels to a workpiece such as a vehicle metal substructure. A composite joint pad has a plate-like metal bushing pre-molded therein. The bushing comprises a raised central embossment having an exposed portion terminating in an arcuate sectioned rim extremity positioned a predetermined distance outwardly from the bonding face of the pad. Upon the bushing exposed embossment being received in a panel aperture, the pad's face is bonded to a panel mating surface with the rim flush with an adjacent surrounding surface of the panel. This enables the pad's arcuate sectioned rim to be clampingly attached to the substructure by means of a threaded fastener being overdriven in the bushing stem without causing stress on the panel.

2 Claims, 1 Drawing Sheet

U.S. Patent    Dec. 20, 1988    4,792,475
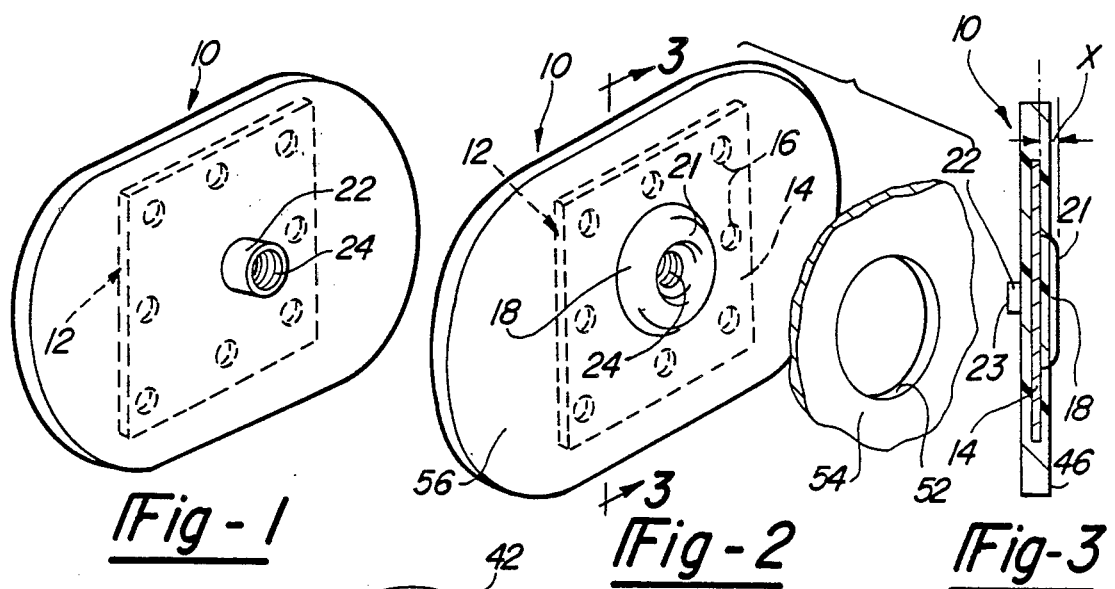
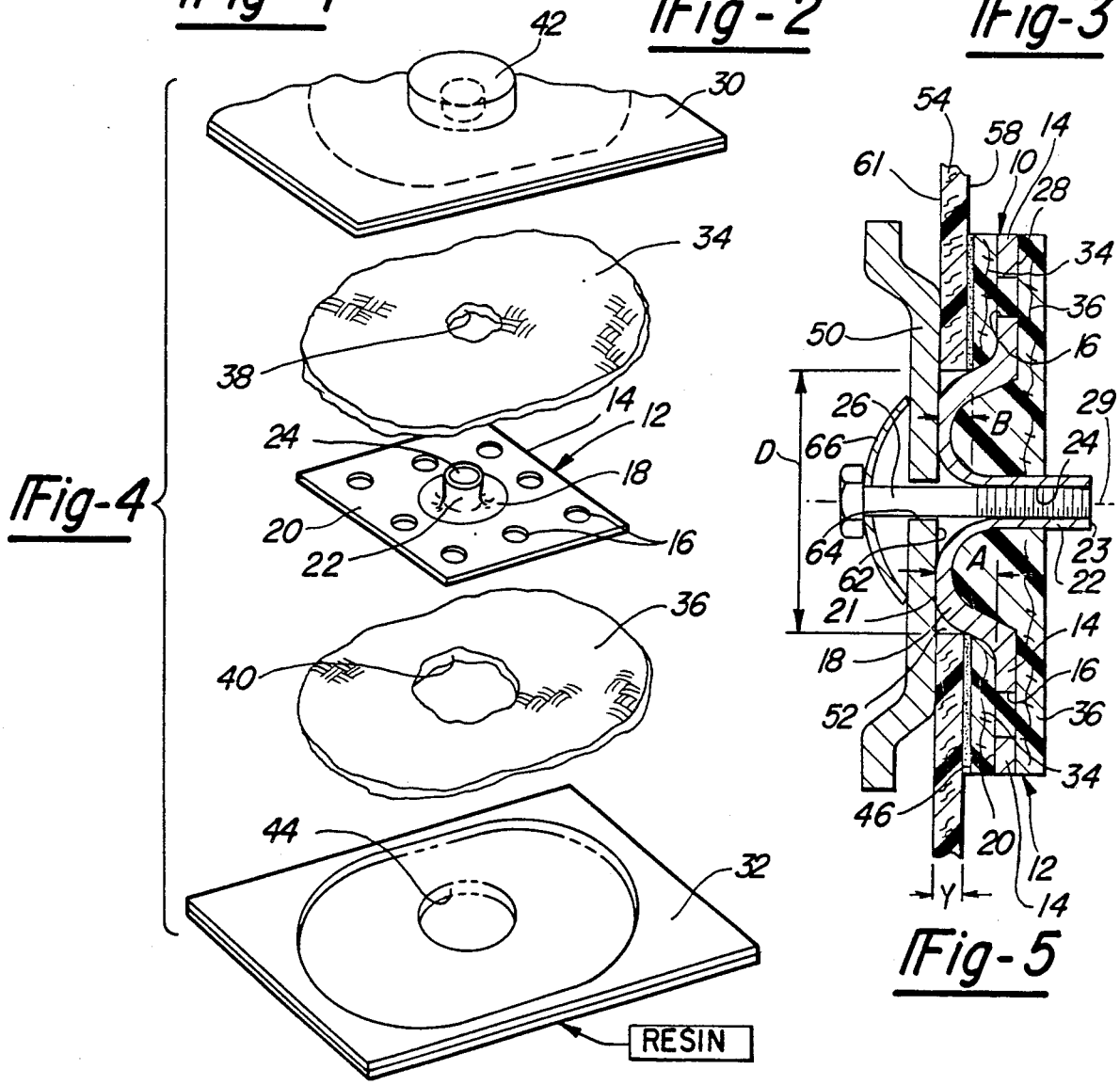

COMPOSITE JOINT PAD FOR SYNTHETIC RESIN PANEL

BACKGROUND OF THE INVENTION

This invention relates to structural composite joints for synthetic resin panels and more particularly to an arrangement and method for incorporating pre-molded structural composite joint pads for attaching a synthetic resin panel to a workpiece such as the metal substructure of an automobile body.

An example of prior art fiber reinforced composite articles having molded-in bushings is shown in U.S. Pat. No. 4,545,837 issued Oct. 8, 1985, to Wehnert et al. The Wehnert patent discloses a method of making a fiber reinforced resin matrix composite bushing for use with a composite article. The patent discusses the problem of effectively fastening or connecting the composite bushing to the composite article without weakening the bushing.

The U.S. Pat. No. 4,652,415 issued Mar. 24, 1987, to Nguyen et al. discloses a method of forming a composite resin and fiber friction pad enclosing a metal plate such that the composite and the metal plate are firmly bonded into an integral pad.

The U.S. Pat. No. 4,448,565 issued May 15, 1984 to Peterson discloses a nut member and composite joint configuration designed to eliminate compressive stresses on synthetic resin work panels.

U.S. Pat. No. 4,238,165 issued Dec. 9, 1980 to Wagner discloses a fastener unit for clamping plastic material having a first predetermined thickness to a relatively thin sheet metal support having a second predetermined thickness.

SUMMARY OF THE INVENTION

The present invention involves incorporating a pre-molded composite joint pad with a synthetic resin panel for attachment of the panel to workpieces such as a vehicle body metal substructure. The development of syntheric resin plastic panels for vehicle bodies in place of steel plates has been an important object in the automotive industry. Plastic panels have desirable properties such as toughness and shock resistance providing a means for reducing the weight of an automotive body while preventing corrosion and reducing production costs.

It is an object of the present invention to provide a composite joint pad having a plate-like metal bushing premolded therein. The enclosed bushing includes a raised central embossment having an exposed portion terminating in an arcuate sectioned rim of a size extending a predetermined distance outwardly from the bonding face of the joint pad. The pad's face is bonded to a synthetic resin panel mating surface with the bushing's exposed arcuate rim flush or even with an adjacent surrounding panel free surface. This enables the panel to be clampingly attached to a metal workpiece surface by means of a fastener threadably received in the bushing stem. As a result the joint pad encased bushing transfers an overdriven fastener compressive bearing loads directly to the workpiece obviating deformation of the synthetic resin panel.

It is another object of the present invention to provide a method of manufacturing a fiber-reinforced pre-molded plastic composite joint pad as a sub-assembly such that it may be subsequently bonded in a ready accurate manner to a synthetic resin panel at a predetermined location. The pre-molded joint pad includes a metal insert bushing having an enclosed plate-like portion while its raised central embossment has an exposed arcuate rim section located a predetermined distance above the joint pad bonding face with the exposed embossment portion adapted for reception in a conforming panel circular opening operative to self-center the joint pad. The panel is of a predetermined thickness substantially equal to but slightly less than the exposed embossment predetermined height such that the embossment arcuate rim extremity is flush with the panel free surface.

It is still another object of the present invention to provide an improved synthetic resin vehicle body panel with one or more structural composite bushing joint pads. Each pad comprises a fastener attachment metal bushing having a plate like portion enclosed in a molded synthetic resin matrix. The joint pad provides a sub-assembly which may be readily and accurately positioned relative to a vehicle plastic panel circular opening by receiving therein the exposed portion of the bushing's raised central embossment prior to being bonded to the panel mating surface by means of adhesives or welding. As a result the panel's opposite free surface is adapted for flush abutment to a supporting metal workpiece enabling a threaded fastener, for example, to be received in the bushing's central threaded bore of the bushing. As the threaded fastener is tightened it applies a clamping force between the metal bushing raised boss arcuate rim extremity and the workpiece thereby obviating compressive stresses being applied to the relatively fragile synthetic resin plastic panel.

BRIEF DESCRIPTION OF THE DRAWINGS

The foregoing, and other objects and advantages of the present invention will become more apparent from the following detailed description when considered with the accompanying drawings, wherein:

FIG. 1 is a perspective view of one form of a subassembly pad showing its outer surface;

FIG. 2 is an exploded fragmentary perspective view of the sub-assembly pad of FIG. 1 showing its inner surface prior to being bonded to one side of a synthetic resin panel;

FIG. 3 is a vertical sectional view taken on line 3—3 of FIG. 2;

FIG. 4 is a schematic perspective view illustrating one of the steps in the sequence of manufacture of the bushing pad sub-assembly of the present invention; and FIG. 5 is an enlarged fragmentary vertical sectional view similar to FIG. 3 showing the bushing pad bonded to a synthetic resin panel and removably clamped to a support structure by a threaded bolt.

DETAILED DESCRIPTION OF THE INVENTION

FIGS. 1-3 illustrate the construction details of the structural composite pad of the present invention. FIG. 4 is a schematic perspective view illustrating a manufacturing step in sequence of the method of the invention. With regard to the construction of the structural composite joint pad 10 FIG. 5 shows a bushing insert member, generally indicated at 12, of generally rectangular plate-like configuration and made of metal, such as steel plate. The bushing insert member 12 includes a plate portion 14 formed with a series of apertures or perforations 16 uniformly spaced around its periphery. The bushing insert provides integral threaded fastener engaging means in the form of a central annular shaped, frusto-conical sectioned embossment 18 raised a predetermined axial distance outward from its plate portion face 20.

The central embossment 18 terminates at a first extremity in an arcuate rim section 21. The embossment terminates in an extruded stem portion 22 extending oppositely from the embossment 18 and terminating at its free end defining a second extremity 23. The stem portion 22 is in the form of a cylindrical open-ended socket having an internally threaded through bore 24. The bore 24 is adapted for threadably engaging a conventional threaded fastener such as a machine bolt shown at 26 in FIG. 5. The stem free end extremity 23 protrudes outwardly from the opposite side surface or back 28 of the bushing plate portion 14 a predetermined distance. The bushing stem bore principal axis 29 of each joint pad is adapted to be self-aligned on the center of its associated workpiece predrilled hole in a manner to be explained.

In FIG. 3 there is seen an exploded schematic view of a mold comprising upper and lower mold pieces or platens 30 and 32, respectively. FIG. 3 shows the insert bushing 12 sandwiched between upper and lower layers of directional, woven glass-fiber cloth or fabric 34 and 36. The upper layer of cloth 34 is apertured at 38 to receive the bushing stem 22 while the lower layer of cloth 36 is apertured at 40 to receive the bushing raised embossment 18. The mold upper platen 30 has a cupola 42 formed therein to receive the bushing stem 22 while the lower platen 32 has a central annular recess 44 to receive the embossment 18. The bushing 12 and the layers of cloth 34 and 36 are appropriately positioned in the mold cavities and the mold platens 31 and 32 closed. A suitable synthetic resin is injected into the closed mold in a conventional manner and heat and pressure are applied to the composite attachment bushing in the mold cavity. This causes the synthetic resin to flow through the bushing perforations 16 and around its outer edges and enclose the metal insert bushing. Such a molding procedure is conventional and is described in the above-mentioned U.S. Pat. No. 4,652,415, for example.

Upon the composite structural joint pad 10 being removed from the mold it appears as shown in FIGS. 1 and 2. It will be noted that the raised embossment arcuate rim portion 21 protrudes a predetermined distance "A" outwardly from its face 20, as seen in FIG. 5. The molded attachment joint pads 10 are used to secure large synthetic resin panels to a supporting workpiece such as a vehicle body metal substructure indicated at 50 in FIG. 5. Reference may be made to U.S. Pat. No. 4,597,153 issued July 1, 1986 to Zaydel for an example of such a vehicle substructure supporting a synthetic resin plastic body panel.

The pre-formed or pre-molded joint pad 10 provides a sub-assembly adapted for incorporation with a synthetic resin panel. Thus, the enclosed bushing plate-like portion has its raised embossment 18 exposed portion sized for insertion in a circular opening 52 formed in a synthetic resin panel 54 having a predetermined thickness "Y". The synthetic resin panel circular opening 52 is of a predetermined diameter "D" enabling the frusto-conical embossment exposed portion to be received therein as shown in FIG. 5. The composite attachment joint pad 10 next has its one bonding face 46 bonded to one inner mating surface 58 of the panel 54 such by a suitable layer of adhesive material indicated at 60 in FIG. 5.

It will be noted in FIG. 5 that the synthetic resin panel 54 has a predetermined thickness "Y" which is substantially equal to but slightly less than dimension "B" between the pad bonding face 46 and the bushing arcuate rim extremity 21. Thus it will be appreciated that upon the panel 54 having a portion of its free surface 61 and arcuate rim extremity 21 of joint pad 10 contacting exposed surface 62 of the supporting workpiece 50 a flush abutting metal-to-metal juncture is attained between the bushing embossment arcuate rim extremity 21 and the workpiece surface 62.

The threaded fastener or bolt 26 is next inserted through support member hole 64 and axially aligned stem internal bore 24. Upon the fastener 26 being threadably overdriven in internal screw threads 24 the bushing embossment arcuate rim section 21 is tightly clamped directly to the workpiece surface 62 along the parting line or plane defined thereby. A suitable locking washer such as the dome-shaped locking washer 66, may be used to positively retain the threaded fastener 26. When the bolt 26 is tightened it will be appreciated that compressive force is applied directly between the metal support member 50 and the metal insert bushing embossment 18. Thus, no compressive stress or clamping forces are transferred to the synthetic resin panel 54 obviating the possibility of plastic deformation or "cold flow" of the synthetic plastic panel causing a undesirable reduction in its strength.

It will be noted in FIG. 5 that the circular opening 52 of the panel 54 has a predetermined diameter "D" adapted to receive the embossment exposed portion so as to self-center the principal axis 29 of the bore 24 in alignment with the center of support member preformed hole 64. This axial self-alignment is achieved because the inwardly sloped side of the frusto-conical shaped exposed embossment portion functions to self-center the bore axis 29 with the center of the panel circular hole 64. As the panel incorporates a plurality of joint pads 10 it is critical that each pad threaded bore principal axis 29 be self-aligned with the center of its associated workpiece hole 64 for assembly line fabrication of the panel 54 on a vehicle substructure.

It is understood that the invention is not limited to the exact construction illustrated and described above but that various changes and modifications may be made without departing from the spirit and scope of the invention as defined in the following claims.

What is claimed is:

1. In a composite joint pad designed to clamp a synthetic resin panel to a workpiece comprising:

a metal bushing in the form of a plate portion formed with a central annular raised embossment terminating in a tubular stem portion extending normally to said plate like portion and having an internally threaded bore;

said bushing plate portion enclosed within a fiber reinforced composite structural joint pad such that said raised embossment defines an exposed portion terminating in an arcuate rim first extremity located a predetermined axial distance outwardly from one bonding face of said pad and said stem portion free end defining a second extremity extending a predetermined distance outwardly from the opposite face of said pad, a synthetic resin panel having one mating surface and an opposite free surface, said panel mating surface bonded to said pad bonding surface and formed with a circular opening therein into which said central embossment exposed extremity extends such that said embossment arcuate rim is located flush with said panel opposite free surface;

whereby said panel opposite free surface is adapted to be secured in flush relation to a workpiece surface having a fastener hole aligned on the axis of said stem portion through bore, a threaded fastener extending through said workpiece panel hole and into threaded engagement with said stem bore wherein said embossment arcuate rim extremity is in flush metal-to-metal abutment with said workpiece surface thereby obviating fastener clamping forces being applied to said synthetic resin panel.

2. The panel joint as set forth in claim 1, wherein said embossment exposed extremity being frusto-conical shaped in section defining an upwardly and inwardly sloped side sized for mating reception in said panel circular opening, and said workpiece being provided with a plurality of attachment holes, such that each said workpiece hole has its center self-aligned on its associated stem bore axis.

* * * * *